Aug. 21, 1956 R. A. CRUMBLISS 2,760,140
MOTOR VEHICLE ELECTRICAL CIRCUIT
Filed Nov. 29, 1951

INVENTOR.
Ranza A. Crumbliss
BY
Soans, Gleisten Anderson
Attys.

United States Patent Office 2,760,140
Patented Aug. 21, 1956

2,760,140

MOTOR VEHICLE ELECTRICAL CIRCUIT

Ranza A. Crumbliss, Chicago, Ill.

Application November 29, 1951, Serial No. 258,821

4 Claims. (Cl. 320—32)

The present invention relates, in general, to the electrical circuits of motor vehicles and, more particularly, relates to an improved regulator unit for such circuits.

As is well known, motor vehicle electrical circuits comprise, in general, four basic circuit components and, in this connection, such circuits include a generator which is mechanically driven by the engine of the vehicle, an electrical load such as the starter, lights, radio, heater and fans, and a battery which supplies electrical energy for the electrical load when the generator is not supplying the energy for the electrical load. The fourth basic component of the circuit comprises a regulator unit which is adapted to protect the generator and the battery under certain conditions. More particularly, the regualtor unit is operative to prevent the battery from discharging through the generator when the voltage output of the generator is less than that of the battery; to control the voltage of the generator so as to prevent damage to the load components; and to limit the current output of the generator so as to obviate burning out of the generator winding.

In order to limit the generator voltage, the regulator causes a resistance to be intermittently placed in the field of the generator which results in not only limiting the voltage of the generator but also the current output of the generator. In the operation of conventional automobile regulators, it has been the usual practice to commence control of the voltage of the generator at about 6.2 volts by intermittently inserting the resistance and to limit the voltage output of the generator to 7.2 volts. Thus, whenever the voltage of the generator exceeded 6.2 volts, the regulator commenced limiting the voltage and inherently began limiting the current output of the generator so that the battery was not charged as rapidly as possible.

With the provision of more accessories, during cold weather, and under certain operating conditions, unusually heavy demands are placed upon the battery so that it has been thought necessary to adjust the regulator so as to permit the battery to be charged at the maximum rate, i. e. without voltage and resulting current control, up to a voltage of about 6.8 volts. However, when the regulator was adjusted so that the voltage was uncontrolled up to this level, the generator was permitted by the regulator to put out 8.0 or more volts. Such adjustment has resulted in boiling water out of the battery, battery damage and is undesirable for assuring satisfactory operation and long life of various elements of the electrical system.

Accordingly, the principal object of the present invention is the provision of improved electrical means for maintaining an adequate charge in a battery in conventional motor vehicles under most adverse operating conditions. This and other objects of the invention, as will become more clear hereinafter, are accomplished by a modification of conventional regulators and of the motor vehicle electrical circuit.

One embodiment of the invention is illustrated in the accompanying drawings and, in the drawings.

Figure 1:
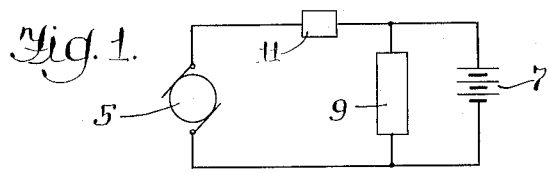
Figure 1 illustrates, diagrammatically, a conventional motor vehicle electrical system.

Figure 1 of the drawings illustrates diagrammatically and in general a conventional motor vehicle circuit comprising a generator 5, a battery 7, and an electrical load designated generally by the numeral 9. As previously noted, the load usually includes the starter and such accessories as lights, radio, and heater. The circuit further includes a regulator 11 which is usually one of two types, one type being illustrated in Figure 2 and being generally designated by the numeral 15, and the other type being shown in Figure 3 and generally designated by the numeral 17. As will appear more clearly hereinafter, these regulators do not differ functionally from one another but merely differ in that they place resistance in the field of the generator 5 at a different point for purposes of controlling the voltage and current output.

Figure 2:
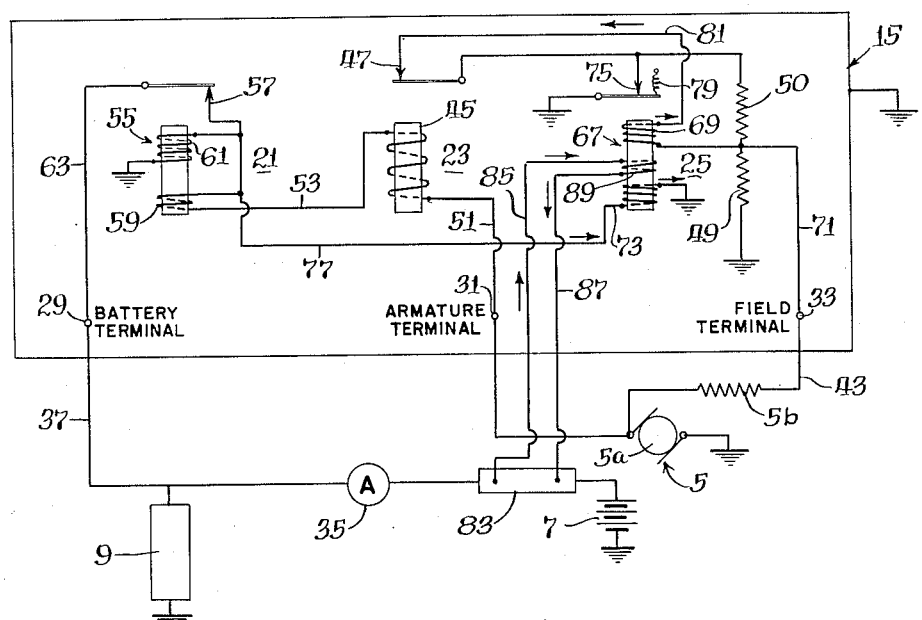
Figure 2 is a circuit diagram of one type of conventional motor vehicle circuit incorporating the improved means of the invention.
Figure 3:
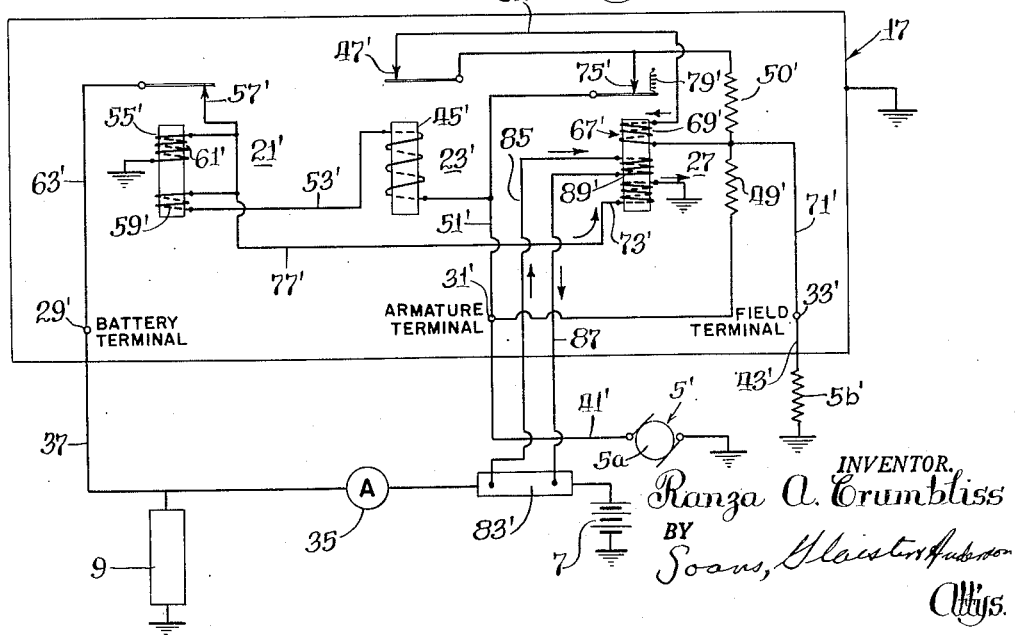
Figure 3 is a circuit diagram of another type of conventional motor vehicle circuit which also incorporates the improved means of the invention.

The relationship of the regulator 11 to the circuit elements of the motor vehicle system is illustrated more particularly in Figures 2 and 3. Elements of the regulator 17 which are the same as those of regulator 15 are similarly numbered but are differentiated by the symbol prime ('). Each of the regulators 15 and 17 comprises three basic circuits and in this connection, each regulator includes a cut out circuit 21 and 21' which is adapted to prevent the battery 7 from discharging through the generator 5 when the generator voltage is less than the battery voltage; a current regulator circuit 23 and 23', this circuit being operable to limit the current output of the generator 5; and a voltage regulator circuit adapted to control the voltage output of the generator. Since the voltage regulator circuit in the regulator 15 differs from that in the regulator 17, these circuits are designated by the numerals 25 and 27, respectively.

In order to connect these various circuits to the motor vehicle electrical system, each regulator, 15 and 17, is provided with a battery terminal 29 and 29', an armature terminal 31 and 31', and a field terminal 33 and 33'. The battery terminals 29 and 29' are connected to the battery 7 through an ammeter 35 by means of leads 37 and 37'. The leads 37 and 37' may connect to the load 9, as shown. The armature terminals 31 and 31' connect to the armatures 5a and 5a' of the generators 5 and 5', respectively, by means of leads 41 and 41' and the field terminals 33 and 33' are in conductive relation with the fields 5b and 5b' of the generators 5 and 5' through other leads 43 and 43'.

For convenience and clarity, the regulator 15 will be described first and then the regulator 17 will be described by pointing out the particular variation from regulator 15. In the regulator 15, the armture terminal 31 connects to the battery terminal 29 through the current regulator circuit 23 and the cut out circuit 21 thereby connecting the armature 5a to the battery 7 and load 9. In order to clearly understand this connection, the current regulator circuit comprises a solenoid 45 which is operable to open a pair of contacts 47 and thereby control the current output of the generator by putting a resistance, comprising resistances 49 and 50 in parallel, in series with the field 5b of the generator 5 in a manner to be more fully described below. The solenoid 45 connects to the armature terminal 31 through conductor 51. The current regulator circuit 23 connects, through conductor 53, to the cut out circuit 21 which also includes a solenoid 55. A pair of contacts 57 are closed by the solenoid when the generator voltage exceeds the battery voltage, the contacts otherwise remaining open and thereby disconnecting the battery 7 and load 9 from the generator armature 5a. The solenoid comprises a pair of windings, one winding 59 being a compensating winding which is in series with conductor 53 and the other winding 61 being a voltage winding which controls the opening of the contacts 57. The voltage winding is connected to ground and conductor 53 through the compensating winding 59, and contacts 57 connect to conductor 53 in like manner, the contacts also connecting to the battery terminal 29 through a conductor 63. Thus, the armature terminal 31 connects to the battery terminal 29 through solenoid 45 of the current regulating circuit 23, the compensating winding of the solenoid 55 associated with the cut out circuit 21, contacts 57 also associated with the cut out circuit and conductor 63.

Before considering the voltage regulator circuit 25 in detail and the control operation of the current regulator circuit 23, it should be noted that if these two circuits are not operative, the generator field 5b is connected directly to ground permitting the generator to put out maximum voltage and current, which are then determined by the speed at which the armature is driven relative to the field. However, when the current regulating circuit is operative, the resistances 49 and 50 are connected, in parallel, to ground in series with the generator field 5b, as pointed out above. On the other hand, when the voltage regulator circuit 25 is operative, the resistance 49 alone is connected to ground in series with the field 5b of the generator, as will appear more clearly hereinafter.

Now considering the circuit elements of the voltage regulator circuit 25, this circuit comprises a solenoid 67 which normally includes a pair of windings, one winding 69 being a compensating winding which is connected to the field terminal 33 through conductor 71, the other winding 73 being a voltage winding which controls the operation of the solenoid by causing contacts 75 to open and close and which is connected to ground and to the generator armature 5a through a conductor 77, winding 59 of the solenoid 55 associated with the cut out circuit 21, the solenoid 45 of the current regulator circuit 23, and conductor 51 which connects to the armature terminal 31. The contacts 75 are connected to ground and are also connected to resistance 50 and to contacts 47 of the current regulating circuit 23 which are in series with the compensating winding 69. As a result, the resistance 50 and contacts 47 are in parallel. As shown in Figure 2, resistance 50 as well as resistance 49 are connected to the field terminal through conductor 71.

The contacts 75 are held together by mechanical means which usually comprises a spring 79, the spring being adjustable to vary the force required to open the contacts 75. Adjustment of this spring will determine the upper and lower limits of the voltage control circuit 25 but will not have any substantial effect upon the range. For example, the spring 79 may be adjusted to permit the contacts 75 to be opened at 6.2 volts so that the upper control limit is 7.2 volts but if the spring prevents the contacts from opening until 7.0 volts, the upper control limit will be 8.0 volts. This spring adjustment has been used in the past and is now being used to maintain the batteries of motor vehicles in a charged condition. However, as indicated above, this is very unsatisfactory because it inherently causes gassing and battery damage when the upper control limit is much above 7.2 volts.

The operation of the cut out circuit 21 has been previously noted and the operations of the voltage regulating circuit 25 and current regulating circuit have been generally described. However, the particular operation of the latter two circuits is as follows: If the current regulating circuit 23 and voltage regulating circuit are inoperative, the field 5b of the generator 5 is connected directly to ground through conductor 71, which connects to the field terminal 33, compensating winding 69, a conductor 81, contacts 47 and contacts 75. Assume now that the current regulator circuit 23 is operative causing contacts 47 to open. As pointed out, this causes resistances 49 and 50 to be connected in parallel to ground and the effective resulting resistance to be placed in series with the generator field 5b. More particularly, when contacts 47 are open, the field 5b is connected to ground through resistance 49 and also through resistance 50 and contacts 75. If the voltage regulator circuit is operative, contacts 75 open and the field is then connected to ground through resistance 49 alone, as noted above.

In actual operations of motor vehicles, contacts 47 of the current regulating circuit open at a predetermined current and varies directly with the maximum output of the generator. For example, if the maximum output of the generator 5 is 60 amps, the solenoid 45 will be adjusted to open the contacts 47 at about 36 amps. while if the maximum output of the generator is greater, the contacts will open at a higher current. However, the contacts 75 associated with the voltage regulator circuit open and close intermittently during operation of this circuit, and commence opening and closing at about 6.2 volts and limit the voltage at about 7.2 volts or may commence opening at 6.8 volts and limit the voltage to 8.0 volts, as above noted. In this connection, it has been generally recognized that the mechanical and electrical limitations of the known regulators prevent decreasing of the gap between the voltage at which the contacts 75 commence opening and the upper voltage limit. Thus, it has not been feasible to effect such a result by adjustment of the windings 69 and 73 and the mechanical means employed for closing contacts 75.

The effect of any opening and closing of the voltage regulator contacts 75 is to decrease the current output of the generator 5 and this occurs independent of the battery's ability to receive a charge. Therefore, the battery may not be charged as rapidly as desired and, as pointed out, this deficiency has been met by raising the voltage at which the contacts 47 commence closing thereby inherently raising the upper control limit of the regulator and endangering the battery.

However, I have found that the gap between the point at which the contacts 75 commence opening and the upper control limit may be effectively decreased when the battery is capable of taking a charge by neutralizing the voltage control circuit 25 at such time. More particularly, I permit the contacts 75 to commence opening at higher voltages without raising the upper control limit so that instead of the normal operation of the contacts 75 commencing to open and close at 6.2 volts and limiting the voltage to 7.2 volts I may cause these contacts to remain closed up to 6.8 volts while still limiting the voltage to 7.2 volts. Therefore, I may permit the battery 7 to be charged up to the limit of the current regulator circuit 23 or the maximum output of the generator, whichever is the controlling factor, up to 6.8 volts and limit the generator voltage to 7.2 volts. As a result, the battery is much more readily charged and battery damage is prevented.

I accomplish this highly improved result by inserting a low resistance shunt 83 in series with the battery 7, the shunt being preferably, but not necessarily, located between the load 9 and the battery 7 as indicated in Figure 2. Two leads, 85 and 87, are connected to the shunt at different points 80 so that there is a slight difference of potential between the leads. The leads 85 and 87 are connected to a winding 89 which is wrapped around the solenoid 67 of the voltage control circuit 25. The winding 89 is wound oppositely to the windings 69 and 73 on the solenoid 67 so that when a current flows in this winding 89, the effect of the other windings 69 and 73 is opposed.

The number of turns in the winding 89 is determined essentially by three factors, namely, the potential between leads 85 and 87 which is determined by the points where these leads are tapped from the shunt 83 and, in addition, the maximum current which is supplied to the battery, this current being limited by either the current regulating circuit or the maximum output of the generator 5, whichever is the lower current. The third determining factor is the voltage at which it is desired that the contacts 75 commence opening. It is apparent, therefore, that the turns of the winding 89, potential between the leads 85 and 87, and maximum supply current for the battery are inter-related and may be adjusted to achieve the desired results. Thus it will be apparent that various modifications of the circuit arrangement are possible within the scope of my invention. In addition, the subject matter of my invention may be used with the other type regulator 17 which is shown in Figure 3 of the drawings and which will be generally described in the following.

In this regulator 17, the cut out circuit 21' and current regulator circuit 23' are similar to the circuits 21 and 23 of the regulator 15. However, the voltage regulator circuit 27 is connected together in a somewhat different manner. More particularly, the resistance 49', in place of being grounded, is connected to the armature terminal 31' and the contacts 75', associated with the voltage regulator circuit 27, are also connected to the armature terminal 31' instead of ground as in the regulator 15. The effect of these modifications is to ground the resistance 49' and the contacts 75' through the field 5b' of the generator 5'. In this connection, it will be noted that the field 5b' is grounded and is connected to the armature 5a' through the regulator 17.

It will be seen that the respective regulators 15 and 17 are useable with different type generators but, as indicated above, operate in substantially the same manner. Similarly, my invention acts in the same manner as described above to control the voltage regulator circuit 27.

In operation of either type of regulator, i. e. 15 or 17, the generator is permitted to charge the battery 7 without control of the voltage regulator circuit 25 up to a predetermined voltage so that the charging rate is only limited by the current regulator circuit 23 or the maximum output of the generator 5. The predetermined voltage is, of course, determined primarily by the number of turns in winding 89, the maximum current flowing in this winding 89. After the predetermined voltage has been reached, the contacts 75 commence opening and closing to control the voltage of the generator 5 and consequently the current output is inherently decreased so that less current goes to the battery. This has a degenerative effect upon the effect of the winding 89. In other words, as the current to the battery decreases the winding is less effective permitting the contacts 75 to open and close at a faster rate, providing increased voltage control and less current from the generator thereby causing even current to flow to the battery 7 and further limiting the effect of winding 89. Finally, when the upper control limit of the regulator is reached, which limit is determined by mechanical adjustment of the regulator, the winding is effectively removed and the battery is in a charged condition.

The upper control limit of the generator is preferably set at about 7.2 volts so as to prevent any gassing of the battery and, as indicated, the lower limit is preferably set at about 6.8 volts so that the battery is substantially charged before the voltage regulator circuit 25 or 27 commences limiting the current output of the generator 5 or 5'.

My improvement has many advantages as for example extending battery life and making possible the use of lower capacity and more economical batteries. In addition, the invention may be economically installed without difficulty and is easily adaptable for both existing regulators and new regulators.

The various features of the invention which are believed to be new are set forth in the following claims:

I claim:

1. An improved regulator unit for a motor vehicle electrical circuit which includes a battery and a generator having an armature and a shunt field, the battery and armature of the generator being adapted for connection in series through the regulator, said regulator comprising voltage regulator means for intermittently connecting a resistance in series with the shunt field to regulate the output of the generator, actuating means associated with said connecting means for regulating the generator output within a predetermined range, the upper end of said voltage range exceeding the rated voltage of the battery, and means energized solely by the current flow to the battery and electrically connected to said actuating means, said energized means being adapted to limit the range of regulation by said actuating means to the upper end of said voltage range.

2. An improved regulator unit for a motor vehicle electrical circuit which includes a battery and a generator having an armature and a shunt field, said regulator comprising a resistance, a pair of contacts, spring means mechanically connected to said contacts, a solenoid which exerts a force on said contacts in opposition to said spring means, said solenoid being adapted for connection to the generator and being responsive to the voltage thereof, said spring and said solenoid being adjusted so as to permit said contacts to intermittently connect said resistance in series with the field at a first predetermined voltage and to limit the output of the generator at a second predetermined voltage which is above the rated voltage of the battery, electrical means connected to said resistance and to said contacts for connecting and disconnecting said resistance in series with the shunt field, and a winding wound to produce a magnetic field in opposition to the field of said solenoid upon current flow through said winding, said winding being adjusted so as to permit said resistance to be in series with the field at a predetermined current and at a voltage above said first predetermined voltage and at a voltage above the rated voltage of the battery but below said second predetermined voltage, said winding being energized by the flow of current to the battery, thereby having substantially no effect at said second predetermined voltage.

3. An improved regulator unit for a motor vehicle electrical circuit which includes a battery having a rated voltage of 6 volts and a generator having an armature and a shunt field, said regulator comprising a resistance, a pair of contacts, spring means mechanically connected to said contacts, a solenoid which exerts a force on said contacts in opposition to said spring means, said solenoid being adapted for connection to the generator and being responsive to the voltage thereof, said spring and said solenoid being adjusted so as to permit said contacts to intermittently connect said resistance in series with the field at about 6.2 volts and to limit the voltage output of the generator to about 7.2 volts, electrical means connected to said resistance and to said contacts for connecting and disconnecting said resistance in series with the shunt field, and a winding wound to produce a magnetic field in opposition to the field of said solenoid upon current flow through said winding, said winding being adjusted so as to permit said resistance to be in series with said field at a predetermined current and at a voltage of about 6.8 volts, said winding being connected so as to be energized in proportion to the flow of current to the battery.

4. An improved regulator unit for a motor vehicle electrical circuit which includes a battery, an electrical load, and a generator having an armature and a shunt field, said regulator comprising a current regulating circuit, a first resistance which is connected in series with said field by said current regulating circuit when the current output of the generator exceeds a predetermined value, a voltage regulating circuit which includes a second resistance, a pair of contacts, spring means mechanically connect to said contacts, a solenoid which exerts a force on said contacts in opposition to said spring means, said solenoid being adapted for connection to the generator and being responsive to the voltage thereof, electrical means connected to said resistance and to said contacts for connecting and disconnecting said resistance in series with the shunt field, said spring and said solenoid being adjusted so as to permit said contacts to intermittently connect said second resistance in series with the field at a first predetermined voltage and to limit the output of the generator at a second predetermined voltage above the rated voltage of the battery, and a winding on said solenoid wound to produce a magnetic field in opposition to the field of said solenoid upon current flow through said winding, said winding being adjusted so as to permit said contacts to close at a voltage above said first predetermined voltage and below said second predetermined voltage, at the current limit, said winding being connected so as to be energized by the flow of current to the battery, whereby said winding is substantially without effect at said second predetermined voltage.

References Cited in the file of this patent

UNITED STATES PATENTS

| | | |
|---|---|---|
| 1,336,520 | Hertner | Apr. 13, 1920 |
| 1,543,863 | Merrill | June 30, 1925 |
| 2,218,109 | Hochsetter | Oct. 15, 1940 |
| 2,339,037 | Thompson | Jan. 11, 1944 |

FOREIGN PATENTS

| | | |
|---|---|---|
| 437,269 | Great Britain | July 11, 1934 |